(12) United States Patent
Matsumoto et al.

(10) Patent No.: US 7,430,939 B2
(45) Date of Patent: Oct. 7, 2008

(54) LAYING DEVICE FOR LAYING LINE ELEMENT

(75) Inventors: Kuniyasu Matsumoto, Yamanashi (JP); Hiroshi Nakagawa, Yamanashi (JP); Masahiro Morioka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 620 days.

(21) Appl. No.: 10/810,698

(22) Filed: Mar. 29, 2004

(65) Prior Publication Data

US 2004/0200304 A1    Oct. 14, 2004

(30) Foreign Application Priority Data

Mar. 31, 2003    (JP)    ............... 2003-095592

(51) Int. Cl.
*B25J 17/00*    (2006.01)
*B25J 18/00*    (2006.01)

(52) U.S. Cl. ...................... 74/490.02; 901/28

(58) Field of Classification Search ............. 74/490.02, 74/490.03, 490.05, 490.06; 901/23, 28, 29; 318/568.21
See application file for complete search history.

(56) References Cited

U.S. PATENT DOCUMENTS

| 5,454,737 | A | * | 10/1995 | Saba ........................... 439/655 |
| 5,777,267 | A | * | 7/1998 | Szydel ..................... 174/72 A |
| 6,014,909 | A | * | 1/2000 | Fiora ........................ 74/490.02 |
| 6,431,018 | B1 | | 8/2002 | Okada et al. |
| 6,795,750 | B2 | * | 9/2004 | Kullborg .................... 700/245 |
| 7,069,808 | B2 | * | 7/2006 | Uematsu et al. .......... 74/490.02 |

FOREIGN PATENT DOCUMENTS

| EP | 0 873 826 A2 | 10/1998 |
| EP | 1 083 030 A2 | 3/2001 |
| EP | 1 355 400 A1 | 10/2003 |
| JP | 05-138580 | 6/1993 |
| JP | 05-293788 | 11/1993 |
| JP | 10-329079 | 12/1998 |
| JP | 11-504869 | 5/1999 |
| JP | 2001-150382 | 6/2001 |
| JP | 2002-079487 | 3/2002 |
| WO | 97/26118 | 7/1997 |

* cited by examiner

*Primary Examiner*—Richard W L Ridley
*Assistant Examiner*—James Pilkington
(74) *Attorney, Agent, or Firm*—Staas & Halsey LLP

(57) ABSTRACT

A robot arm is provided at a forward end thereof with a rotation shaft member rotatable about a rotation axis thereof, in which a hollow portion is formed along the rotation axis. A laying device for laying a line element includes a relaying means for relaying an arm side section of the line element, extending through the hollow portion out of a lead-out opening formed on a side of the rotation shaft member, to a tool side section of the line element extending from the tool. A direction in which the relaying means connects the line element is substantially parallel to a tool mount surface and forms an angle other than 0° with regard to a radial direction perpendicular to the rotation axis.

8 Claims, 8 Drawing Sheets

LAYING DEVICE FOR LAYING LINE ELEMENT

BACKGROUND OF THE INVENTION

1. Field of the Invention

The present relates to a laying device for laying a line element connected to a tool attached to a forward end of an arm of a robot. The laying device according to the present invention is typically used for laying line elements such as electric and/or fluid supply lines in a forward end of an arm of an industrial robot.

2. Description of the Related Art

Most of tools attached to a forward end of an arm of a robot need a supply of electric signals, electric power, or a fluid such as a gas or a liquid, as is well-known. Also, signal lines are often necessary for transferring signals from a tool side to a robot controller or the like. Therefore, a way of laying line elements, connected to the tool attached to the forward end of the robot arm, is important.

Conventional ways of laying line elements extending up to the forward end of the wrist portion of the robot arm are as follows.

(1) A way of arranging the line elements such that they extend on the exterior of the robot arm and are directly connected to the tool:

When this way is used, some means are necessary for preventing the line elements from abrading against or being entangled around the arm or the wrist portion. One of them is to provide a bracket for hanging a bundle of the line elements via a spring and to connect the line elements via the bracket to the tool at the forward end of the wrist portion. Japanese Unexamined Patent Publication No. 2001-150382 also suggests a way of using a line element guide bracket for absorbing a motion of the wrist portion in order to reduce the degree of abrasion or entanglement.

(2) A way of relaying the line elements in a radial direction of the wrist portion near a tool mount surface (flange) of the wrist portion:

This way is described in Japanese Unexamined Patent Publication No. 10-329079. A hollow portion extending along a rotation axis of the wrist portion of the robot is formed in a center portion of the forward end of the wrist portion of the robot, so that the line elements can pass through the hollow portion. The line elements extending through the hollow portion are directed in a radial direction of the wrist portion near the tool mount surface and then relayed by couplings or connectors extending in the radial direction of the wrist portion to be connected to the tool. This way makes it possible to lead the line elements to the tool without exposing the line elements to the exterior.

(3) A way of directing the line elements in the direction of a rotation axis of the wrist portion near a tool mount surface of the wrist portion and relaying them in the direction of the rotation axis:

This way can be also one of several usable ways. However, as longitudinally extending portions of connectors or the like are liable to interfere with the tool, the application of this way is often limited to the case in which elbow-type connectors or couplings are employed. As a special example, Japanese Unexamined Patent Publication No. 2002-79487 suggests a way of combining a tool mount surface and an automated tool changing apparatus to simplify the handling of the line elements. In this way, a hollow portion extending along the rotation axis of the wrist portion of the robot is formed in a center portion of the forward end of the wrist portion, so that the line elements can pass through the hollow portion. Further, the ends of the line elements are arranged circumferentially on the tool mount surface, so that a connection and disconnection of all line elements is performed at once in the direction of the rotation axis when a tool is changed.

(4) Other ways of relaying the line elements:

In other ways of relaying the line elements in the wrist portion of the robot, a rotary joint for connecting the line elements between portions rotated relative to each other (as described in Japanese Unexamined Patent Publication Nos. 5-138580 and 5-293788) or an automated tool changing apparatus for performing a connection and disconnection of the line elements at once in order to allow various kinds of tools to be changed and used at the forward end of the wrist portion (as described in Japanese Unexamined Patent Publication No. 11-504869), etc. can be used.

However, the above-mentioned prior arts have various following problems.

In the first way (1) of arranging the line elements such that they extend on the exterior of the robot arm and are directly connected to the tool, the line elements are exposed as a whole, and therefore, are liable to be damaged by coming into contact with, or getting entangled around, the arm portion or the wrist portion of the robot and peripheral devices. Further, in order to replace the line elements, all of a long section from the tool to a root of the arm must be replaced. Therefore, the replacement of the line elements requires a long time and is expensive, and the maintenance is not easy.

In the above-mentioned way (2) of relaying the line elements in the radial direction of the wrist portion near the tool mount surface of the wrist portion, the line elements are relayed at the wrist portion. Therefore, for example, if a portion of a cable extending ahead of the wrist portion is damaged, only a short section of the line element has to be replaced. As the portion of the cable extending ahead of the wrist portion is generally liable to be damaged, this way has an advantage in maintenance. On the other hand, this way has a disadvantage in which the connectors or couplings used in the relaying portion extend in the radial direction of the wrist portion and therefore a maximum external diameter of the relaying portion including the connectors, etc., must be large.

In other words, an interference area of the relaying portion in operation is very large, which increases possibility of the relaying portion coming into contact with external devices. Further, the larger interference area makes the relaying portion more liable to come into contact even with the other portion of the robot. Therefore, in some cases, an operation range may be restricted. Further, the cables or hoses are required to be movable within the hollow portion, and a mechanism for sealing the hollow portion is necessary to prevent dusts or the like from entering the hollow portion.

When the above-mentioned way (3) of relaying the line elements in the direction of the rotation axis of the wrist portion near the tool mount surface of the wrist portion is employed, the interference between the connectors or couplings and the tool is liable to occur. Thus, in order to avoid this interference, it is required to use elbow type connectors or couplings, thereby preventing the protrusion of the connectors or couplings from the tool mount surface and to make a member (rotation shaft member) formed with the tool mount surface have a larger dimension in a longitudinal direction of the arm. This causes problems of resulting in an increased distance from the arm to the tool and an increased load on the wrist portion.

The above-mentioned way (4) also has a disadvantage. For example, in the way of using the rotary joint as described in Japanese Unexamined Patent Publication No. 5-293788 and the way of combining the relaying portion and the automated tool changing apparatus as described in Japanese Unexamined Patent Publication No. 11-504869, the connection of the connectors is performed in the radial direction. Therefore, the relaying portion has a large maximum external diameter and a complex structure, and is expensive.

SUMMARY OF THE INVENTION

Therefore, an object of the present invention is to eliminate the above-mentioned drawbacks of the prior arts and to provide a laying device, for laying a line element, which allows the line element to be easily changed in the case that they are broken near the tool and which makes the relaying portion more compact so that it is hard for interference with external devices to occur.

According to the present invention, in order to achieve the above-mentioned object, a laying device for laying a line element connected to a tool attached to a forward end of an arm of a robot, which is provided at the forward end thereof with a rotation shaft member rotatable about a rotation axis thereof, is constructed as follows: the rotation shaft member is constructed to have a hollow portion formed along the rotation axis, and a tool mount surface, formed at the forward end of the rotation shaft member, for the tool to be mounted thereon; and the laying device includes a relaying means for relaying a arm side section of the line element, extending through the hollow portion out of a lead-out opening formed on a side of the rotation shaft member, to a tool side section of the line element extending from the tool. Further, the relaying means is constructed so that a direction in which the relaying means connects the sections of the line element is substantially parallel to the tool mount surface and forms an angle other than 0° with regard to a radial direction perpendicular to the rotation axis.

In the above laying device, all of the line elements are preferably relayed in the vicinity of the tool mount surface in order to improve the ease of maintenance.

Preferably, the relaying means is provided in the vicinity of the lead-out opening in order to keep the maximum outer diameter (or interference radius) of the relaying portion at the forward end of the wrist portion small.

More preferably, the laying device includes a plurality of pairs of lead-out openings and associated relaying means.

In a preferable embodiment of the laying device, the angle is 90 degrees.

In order to accommodate many line elements, the laying device may include a plurality of relaying means arranged around the rotation axis. The laying device may include relaying means arranged side by side in the direction of the rotation axis.

Preferably, the above-mentioned laying device further includes seal means for sealing a gap between the lead-out opening and a portion of the line element which passes through the lead-out opening, in order to prevent the entrance of dust or water from the exterior into the interior.

Thus, according to the present invention, in order to eliminate interference of the line element with external devices, the robot in which the rotation shaft member at the forward end of the wrist portion thereof at least has the hollow portion is used, and the line element extending through the hollow portion is led out of the hollow portion at the forward end of the wrist portion.

In the present application, a term "line element" is used to refer to a line structure containing at least one of an electric line and a fluid line. Such an line structure includes, for example, "a cable containing a plurality of electric lines and a plurality of fluid lines", "a cable containing a plurality of electric lines and a fluid line", "a cable containing only a plurality of electric lines" and "a cable containing only a plurality of fluid lines", etc.

BRIEF DESCRIPTION OF THE DRAWINGS

The above and other objects, features and advantages of the present invention will be described in more detail below based on the preferred embodiments with reference to the accompanying drawings, wherein.

DETAILED DESCRIPTION

With reference to the drawings, several embodiments of the present invention will be described below.

Figure 1:
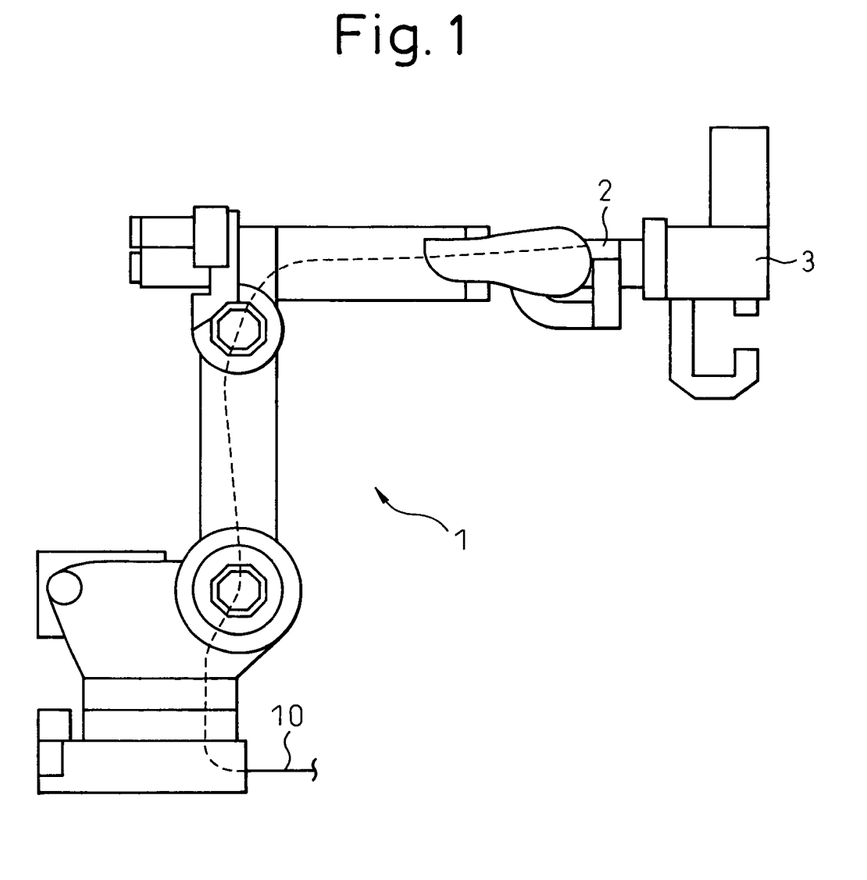
FIG. 1 is a diagrams illustrating a general construction of a robot using a laying device for laying line elements according to the present invention.

FIG. 1 is a diagram illustrating a general construction of a robot using a laying device for laying line elements according to the present invention. A robot generally referenced by reference numeral "1" is provided at a forward end of a arm thereof with a wrist portion 2, to which a tool (in this embodiment, a hand type tool is illustrated) 3 is attached. A laying device according to the present invention is used for laying line elements in the vicinity of a tool mount surface formed at the forward end of the wrist portion 2. It should be noted that a way of laying the line elements in a section leading to the laying device is not limited to a particular one.

FIG. 1 shows a typical example of a route of the line elements 10, such as electric lines and fluid lines, in which they are led from the vicinity of the base of the robot 1 mainly through the interior of the robot mechanism (see a portion shown in broken lines) to the vicinity of the forward end of the wrist portion 2. However, this is merely an example. For example, in some case, all or some of the line elements 10 connected to the tool 3 are led along the exterior of the robot mechanism to the vicinity of the forward end of the wrist portion 2. In most cases, line elements connected to respective servo motors and encoders for respective axes are diverged from the line elements 10 introduced from the vicinity of the base of the robot 1. As these general matters are well-known and not important to the present invention, a detailed description of them are omitted.

Figure 2:
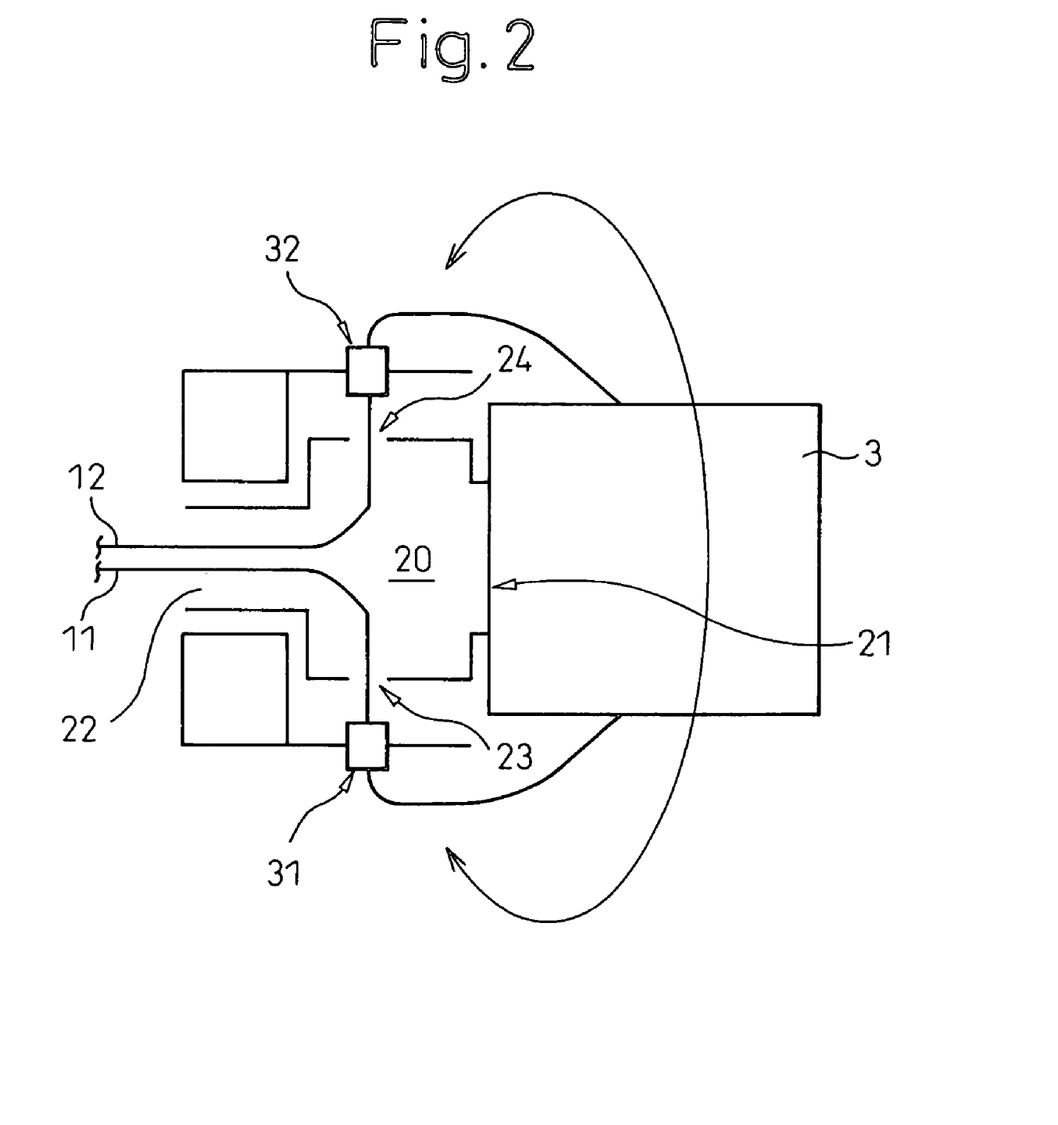
FIG. 2 is a diagram schematically showing a rotational portion at the forward end of the wrist portion of the robot in cross section.

FIG. 2 is a diagram schematically showing a portion at the forward end of the wrist portion in cross section. As shown in FIG. 2, the robot 1 is provided at the forward end of the arm thereof with a rotation shaft member 20, which is provided at the forward end thereof with a tool mount surface 21. A hollow portion 22 extending along a rotation axis of the rotation shaft member 20 is formed inside the rotation shaft member 20. One or more line elements referenced by reference numeral "1" and "12" (in this embodiment, two line elements are shown) are introduced from the wrist portion 2 (see FIG. 1) into the hollow portion 22, and led through lead-out openings 23, 24 formed on the side of the rotation shaft member 20 out of the hollow portion 22. The line elements are then relayed by relaying portions 31, 32 disposed in the vicinity of the lead-out openings 23, 24 to be connected to the tool 3 attached to the tool mount surface 21. Connectors and couplings etc. of the relaying portions 31, 32 are preferably received within a portion nearer to the wrist portion than the tool mount surface 21.

The specific idea of the present invention is incorporated into the construction of the relaying portions 31, 32. Specifically, a condition that a connecting direction in which the relaying portions 31, 32 connect the line elements is substantially parallel to the tool mount surface 21 and forms an angle other than 0° with regard to a radial direction perpendicular to the rotation axis is imposed on the construction of the relaying portions 31, 32.

Figure 3:
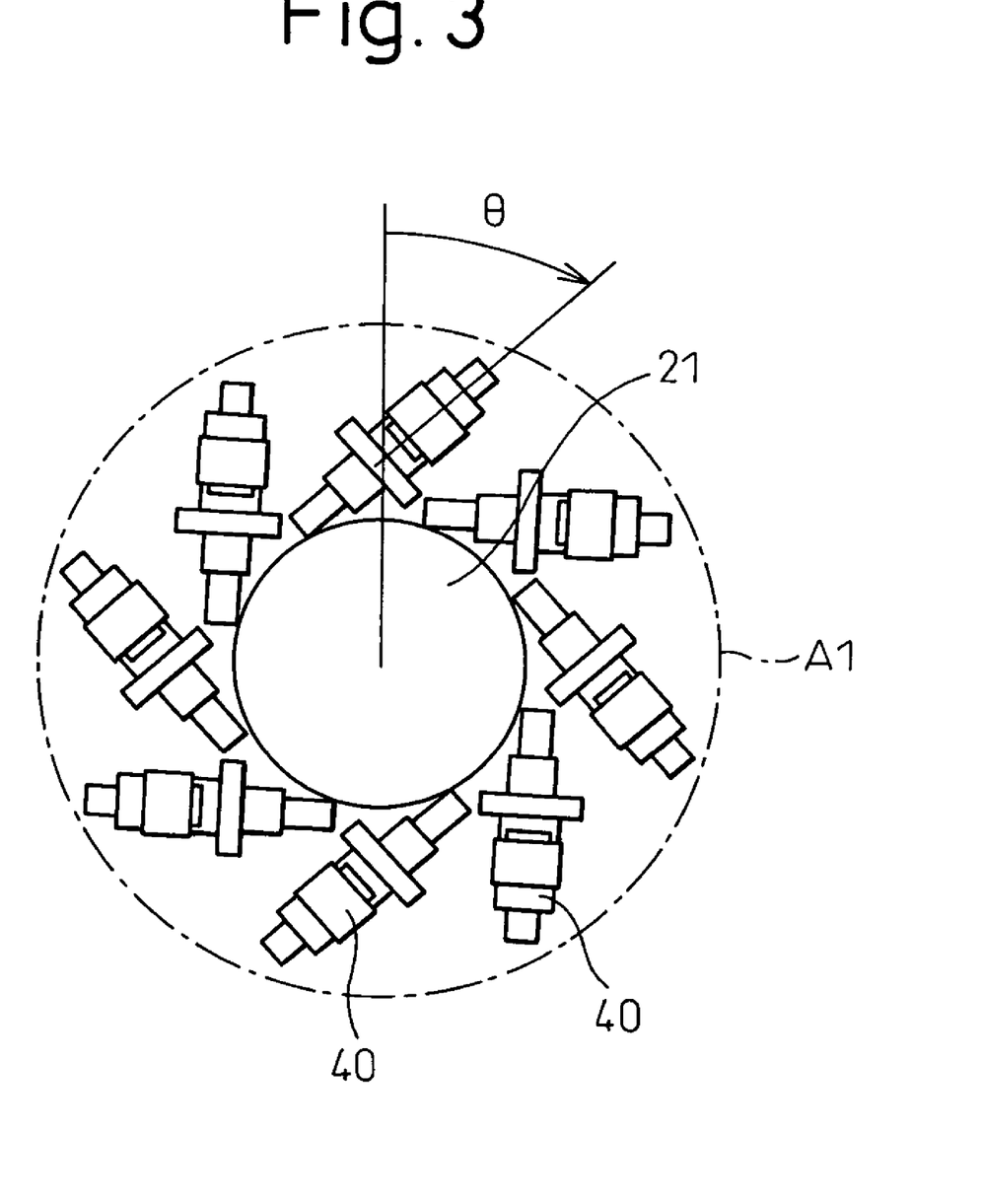
FIG. 3 is a diagram illustrating a first embodiment of the present invention as viewed in an axial direction of a rotation shaft member.

FIG. 3 is a diagram illustrating a first embodiment of the present invention as viewed in an axial direction. In this embodiment, eight relay connectors 40 are used. However, the number of the relay connectors 40 may be more than eight, or may be less than eight. Each of the relay connectors 40 is arranged in a plane substantially parallel to the tool mount surface 21 (a plane parallel to a drawing sheet of FIG. 3) such that the connecting direction of connecting the line elements is inclined by an angle $\theta$ with regard to a radial direction of the tool mount surface 21, as shown in FIG. 3. The angle $\theta$ is defined as an angle other than 0° (in this embodiment, $\theta$ is about 45°). Such an inclined arrangement provides a generally circular interference area as referenced by reference character "A1" in FIG. 3. This interference area A1 is clearly smaller than that in a conventional relaying portion which does not employ an inclined arrangement.

Figure 4:
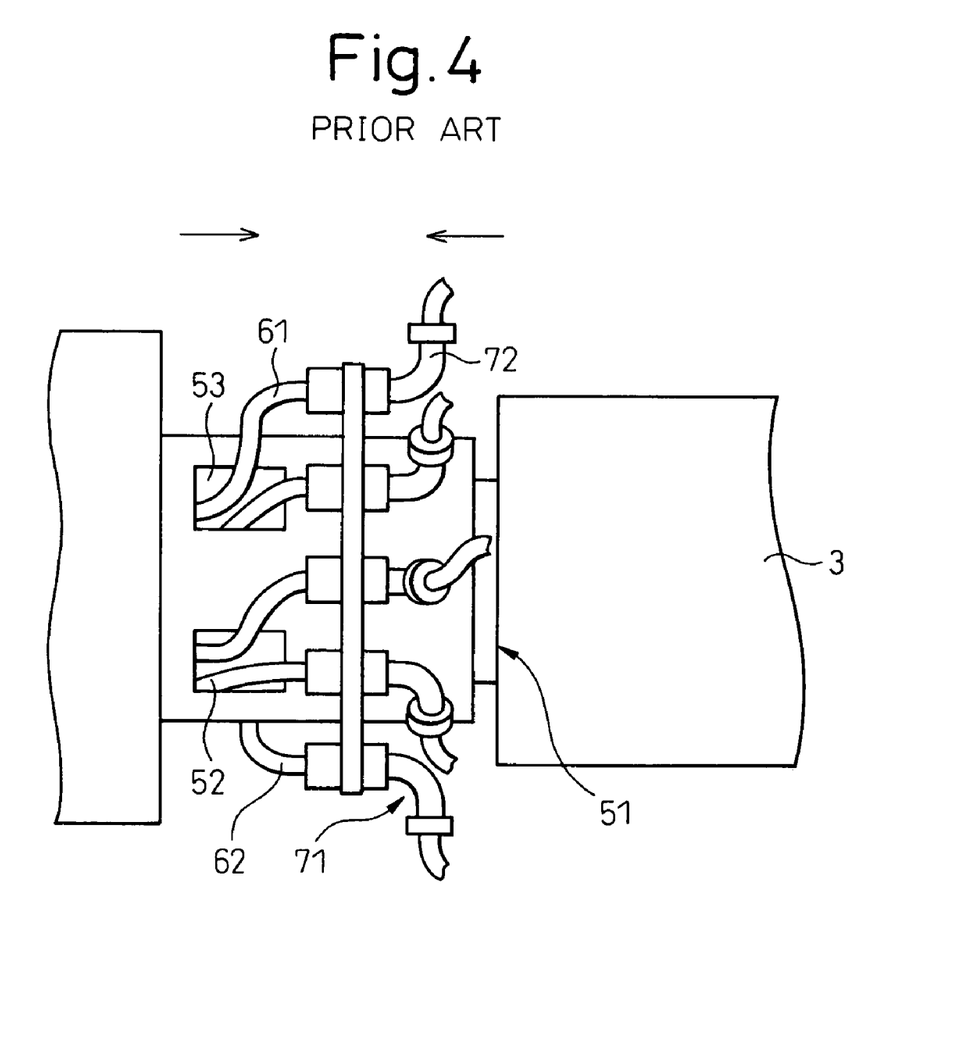
FIG. 4 is a diagram for comparison, illustrating a first conventional example of a relaying portion for relaying line elements in a direction of a rotation axis of a rotation shaft member as viewed from the side of the rotation axis.
Figure 5:
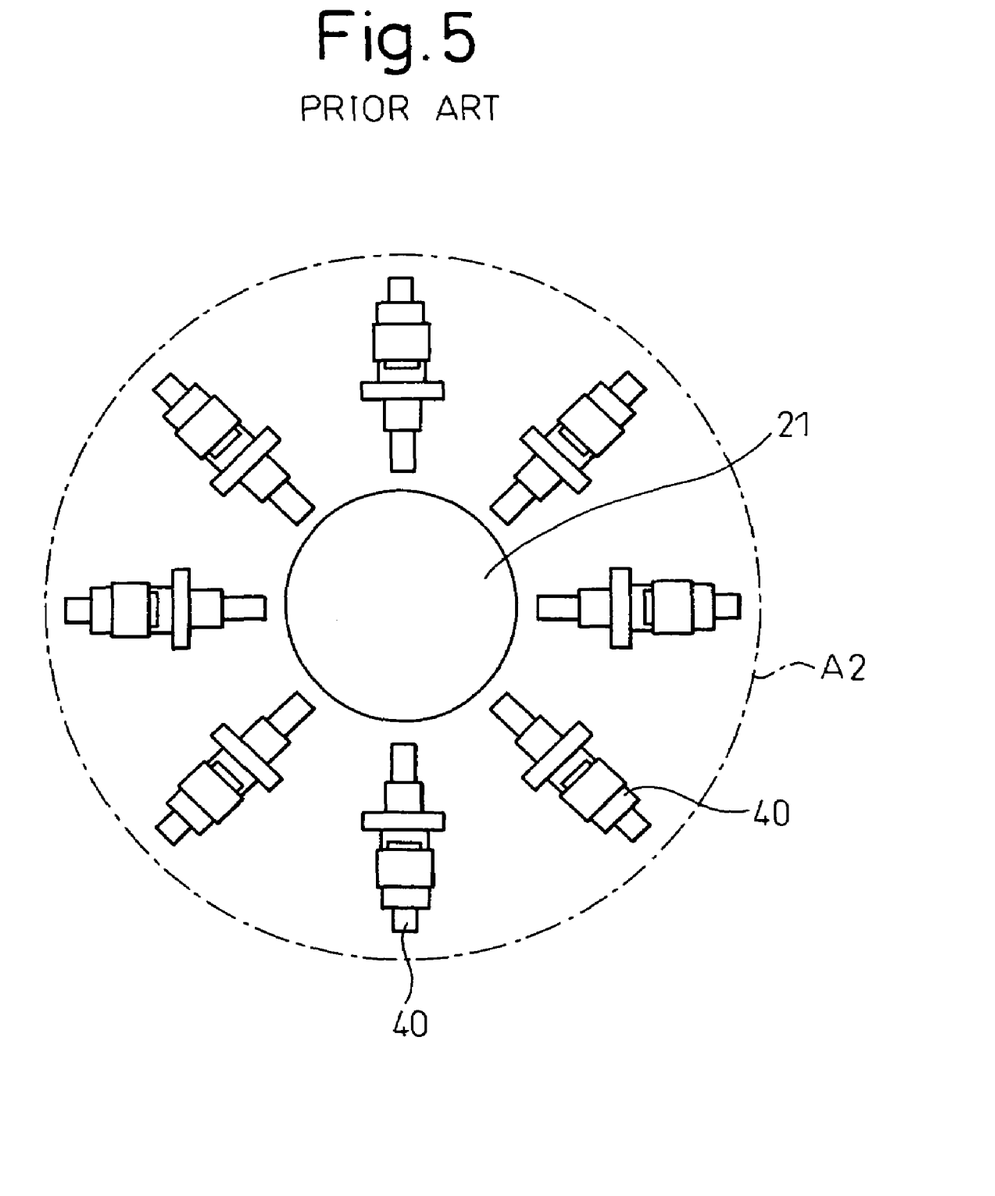
FIG. 5 is a diagram for comparison, illustrating a second conventional example of a relaying portion for relaying line elements in a radial direction of a rotation axis member as viewed in an axial direction of rotation axis member.

FIGS. 4 and 5 illustrate first and second conventional examples for comparison with the present invention. In the first conventional example shown in FIG. 4, a tool 3 is attached to a tool mount surface 51 formed at a forward end of an arm of a robot, while line elements 61, 62 are led through an inside of a rotation shaft member out of openings 52, 53 thereof and relayed by elbow-type connectors or the like 71, 72 to be connected to the tool 3. As a connecting direction of connecting the line elements is directed in an axial direction of the rotation shaft member and elbow-type connectors or the like are used, the rotation shaft member including the tool mount surface 51 is made thick from the viewpoint of preventing interference with the tool 3.

Specifically, this first conventional example employs the above-mentioned way (3). Therefore, in the first conventional example, as the interference between the connectors or couplings and the tool is liable to occur, it is required to use elbow-type connectors or couplings and to make the member (rotation shaft member) including the tool mount surface thicker, in order to prevent the protrusion of the connectors or couplings from the tool mount surface toward the tool side to avoid the interference. This results in an increased distance from the arm to the tool and an increased load on the wrist portion.

The second conventional example shown in FIG. 5 employs a conventional way to arrange connectors in a relaying portion. As shown in FIG. 5, relay connectors 40 similar to those in the first embodiment shown in FIG. 3 are arranged in a plane substantially parallel to a tool mount surface 21 (a plane parallel to a drawing sheet of FIG. 5) such that a direction of connecting line elements is directed in a radial direction of the tool mount surface 21. In other words, the second conventional example corresponds to a case where the angle is defined as $\theta=0°$ in the connector arrangement shown in FIG. 3. Although such a non-inclined arrangement provides a generally circular interference area referenced by reference character "A2" in FIG. 5, the interference area A2 is, of course, larger than the interference area A1 (A1<A2).

Specifically, as the second conventional example employs the above-mentioned way (2) and the connectors or the like are directed from a rotation center of the rotation shaft member toward a radial direction thereof, the interference area must be larger.

As described above, the first and second conventional examples have drawbacks, respectively, while the first embodiment shown in FIG. 3 diminishes those drawbacks.

Figure 6A:
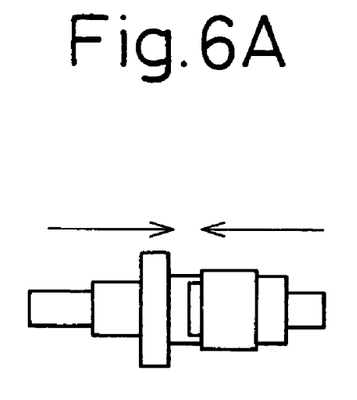
FIG. 6A is a diagram illustrating a connecting direction in a second embodiment of the present invention.
Figure 6B:
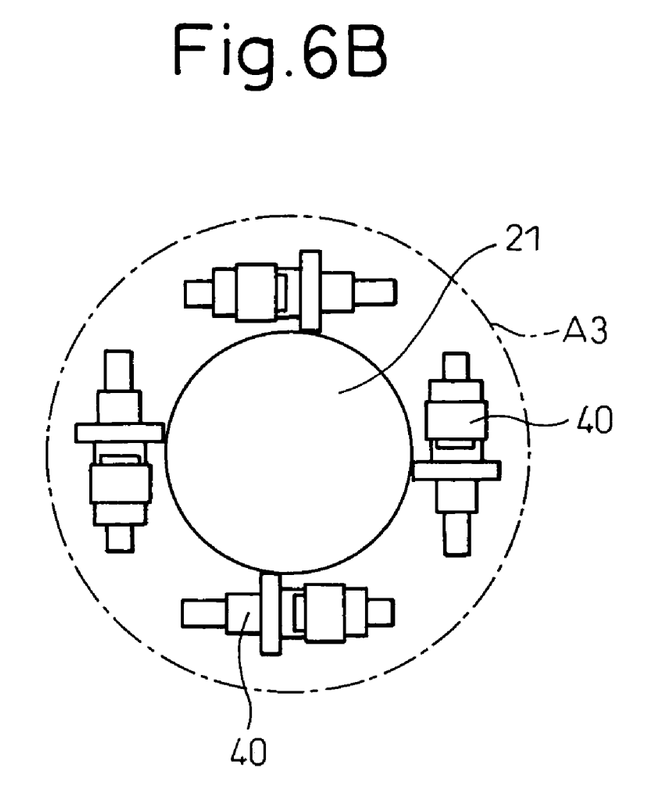
FIG. 6B is a diagram showing a connector arrangement in the second embodiment of the present invention as viewed in an axial direction of a rotation shaft member.

FIGS. 6A and 6B are diagrams illustrating a second embodiment of the present invention. FIG. 6A illustrates a connecting direction and FIG. 6B shows a connector arrangement as viewed in an axial direction of a rotation shaft member. In this embodiment, four relay connectors 40 are used. However, the number of the relay connectors 40 may be more than four, or may be less than four. Each of the relay connectors 40 is arranged in a plane substantially parallel a tool mount surface 21 (a plane parallel to a drawing sheet of FIG. 6B) such that the connecting direction of connecting line elements is directed in a tangential direction.

Specifically, the second embodiment corresponds to an arrangement in which the angle is particularly defined as $\theta=90°$ in the first embodiment. This arrangement for the relay connectors provides a generally circular interference area referenced by reference character "A3" in FIG. 6B. This interference area A3 is smaller than the interference area A1 in the first embodiment.

Figure 7:
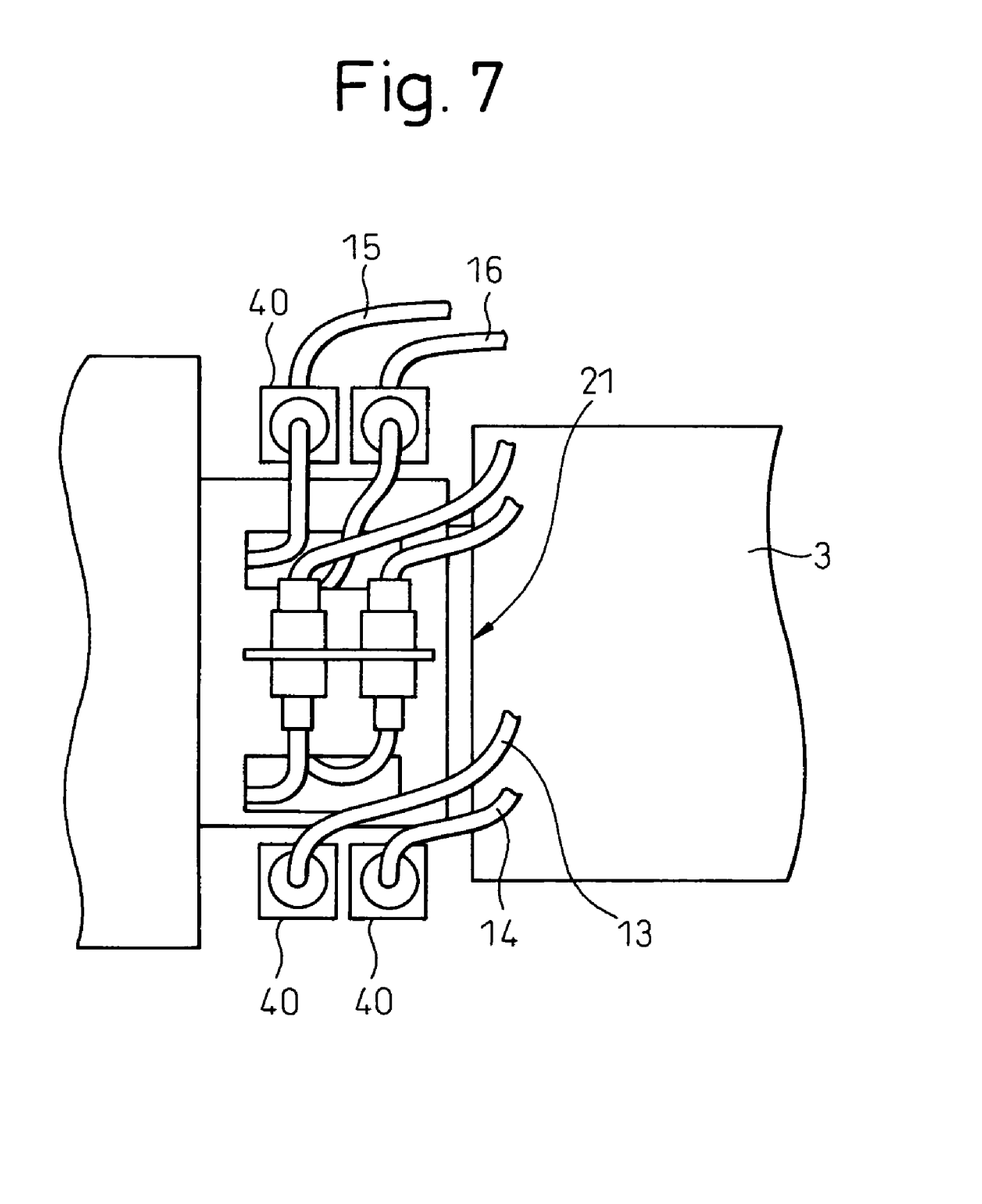
FIG. 7 is a diagram illustrating a third embodiment of the present invention.

In this case, it is possible to increase a total number of the connectors without substantially enlarging the interference area (interference radius) by arranging the relay connectors side by side in a direction of thickness of the tool mount surface (in an axial direction of the rotation shaft member). An example of such an arrangement is shown in FIG. 7 as a third embodiment of the present invention. In the third embodiment, the relay connectors 40 are provided in a two-row arrangement side by side in the direction of thickness of the tool mount surface 21, and the line elements 13-16 are relayed by the relay connectors 40 to be attached to the tool 3.

Figure 8:
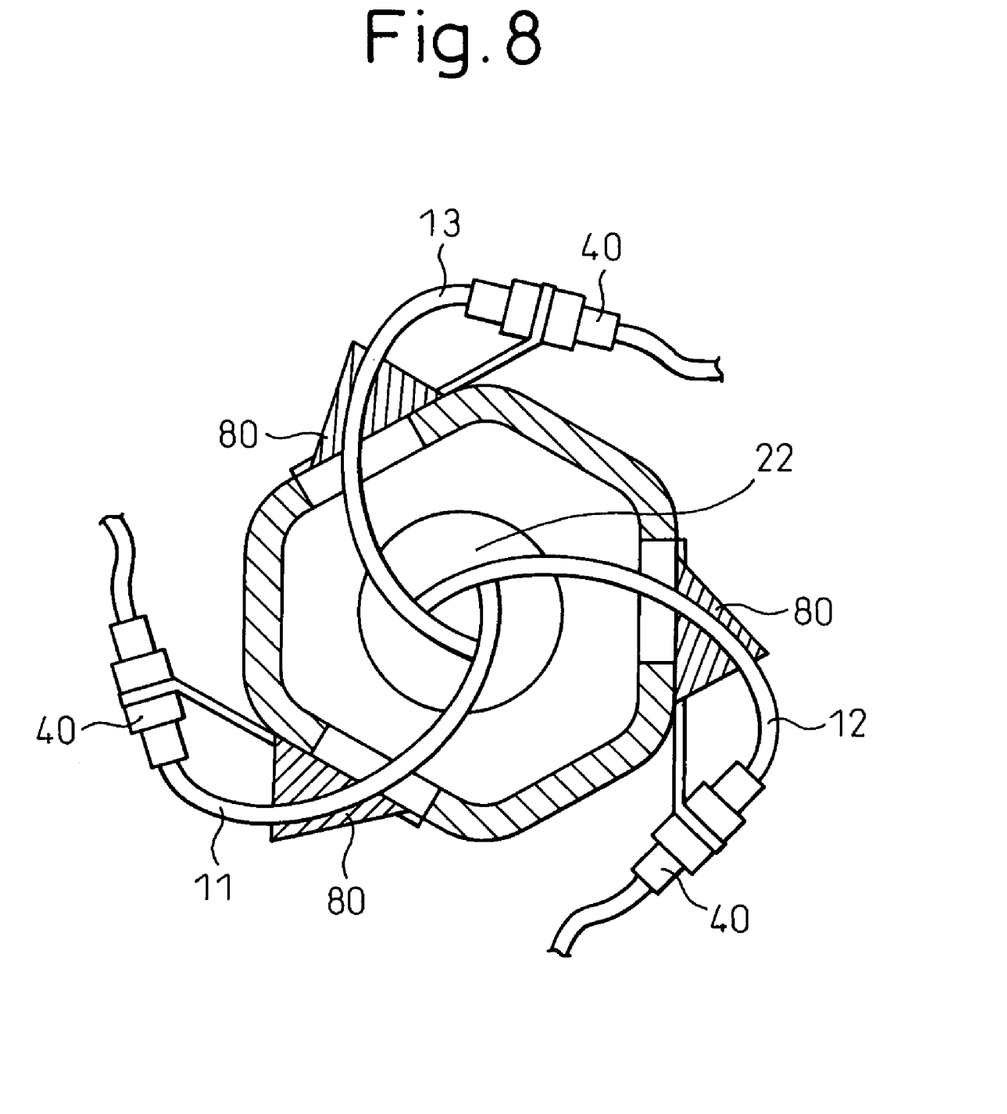
FIG. 8 is a diagram illustrating a fourth embodiment of the present invention.

In the above-mentioned embodiments of the present invention, the regions (lead-out openings) though which the line elements are led out of the hollow portion 22 of the rotation shaft member easily allow dust or water, etc. to enter into the hollow portion 22. FIG. 8 illustrates a fourth embodiment of the present invention which employs a seal structure in order to prevent such an entrance of dust or water. In the fourth embodiment, the regions through which the line elements 11-13 are led out of the hollow portion 22 are sealed by seal members 80 marked with diagonal lines. Various materials usable for the seal member 80 are well-known, and for example, the seal member 80 can be made from acrylonitrile-butadiene rubber (NBR) or the like.

According to the present invention, as the connecting direction of the relay connectors or couplings is inclined with regard to the radial direction of the tool mount surface, the maximum outer radius (interference area) of the relaying portion at the forward end of the hollow wrist portion can be reduced and the total size of the wrist portion including the relaying portion can be made more compact, to thereby decrease the possibility of the interference with external devices. Further, necessity to limit the motion of the robot can be significantly decreased.

While the present invention has been described above with reference to the preferred embodiments shown in the attached drawings, those embodiments are exclusively illustrative and not intended to limit the invention. Accordingly, the present invention should be solely defined by the scope of claim for patent, and could be variously modified and changed without departing from the scope of claim for patent.

What is claimed is:

1. A laying device for laying a line element connected to a tool attached to a forward end of a robot arm, said robot arm provided at the forward end thereof with a rotation shaft member rotatable about a rotation axis thereof, said rotation shaft member having a hollow portion formed along the rotation axis, and a tool mount surface, formed at the forward end of said rotation shaft member, for the tool to be mounted thereon, wherein said laying device comprises a straight relay connector for relaying an arm side section of the line element, extending through said hollow portion out of a lead-out opening formed on a side of said rotation shaft member, to a tool side section of the line element extending from the tool, so that a direction of a longitudinal axis of said straight relay connector is substantially parallel to said tool mount surface and forms an angle other than 0° with regard to a radial direction perpendicular to the rotation axis.

2. The device according to claim 1, wherein said straight relay connector is provided in the vicinity of said lead-out opening.

3. The device according to claim 1, comprising a plurality of pairs of lead-out openings and associated straight relay connectors.

4. The device according to claim 2, comprising a plurality of pairs of lead-out openings and associated straight relay connectors.

5. The device according to claim 1, wherein said angle is 90°.

6. The device according to claim 1, comprising a plurality of straight relay connectors arranged around the rotation axis.

7. The device according to claim 1, comprising straight relay connectors arranged side by side in the direction of the rotation axis.

8. The device according to claim 1, further comprising seal means for sealing a gap between the lead-out opening and a portion of the line element which passes through the lead-out opening.

* * * * *